US007212792B2

(12) United States Patent
Kamitani

(10) Patent No.: US 7,212,792 B2
(45) Date of Patent: May 1, 2007

(54) RECEIVING DEVICE EXECUTING OPERATION OF KIND CORRESPONDING TO KIND OF RECEIVED SIGNAL

(75) Inventor: Tsuyoshi Kamitani, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 405 days.

(21) Appl. No.: 10/736,085

(22) Filed: Dec. 15, 2003

(65) Prior Publication Data

US 2004/0127177 A1 Jul. 1, 2004

(30) Foreign Application Priority Data

Dec. 19, 2002 (JP) ............................ 2002-368210

(51) Int. Cl.
*G06F 3/033* (2006.01)
*H04B 1/18* (2006.01)
*H04N 5/44* (2006.01)

(52) U.S. Cl. .................. 455/130; 455/185.1; 455/352; 348/734

(58) Field of Classification Search ............ 455/185.1, 455/130, 352; 348/734, 731, 725, 569; 725/68, 725/57, 37, 56, 131, 176; 341/176; 386/83, 386/125, 46

See application file for complete search history.

(56) References Cited

U.S. PATENT DOCUMENTS 4,731,654 A * 3/1988 Itabashi et al. ............ 348/725
5,157,496 A * 10/1992 Kurosawa .................... 725/56
5,434,626 A * 7/1995 Hayashi et al. ............ 348/734
5,757,414 A * 5/1998 Thorne ........................ 725/14
5,774,187 A * 6/1998 Tsunoda ..................... 348/734
6,037,969 A * 3/2000 Lim et al. ..................... 725/28
6,757,030 B2 * 6/2004 Umeda ....................... 348/734
2002/0007487 A1 * 1/2002 Matsumoto et al. .......... 725/37
2002/0113896 A1 * 8/2002 Takagi et al. ............... 348/569
2005/0190295 A1 * 9/2005 Mizutome et al. .......... 348/553

FOREIGN PATENT DOCUMENTS

JP 1-119181 5/1989
JP 5-197470 8/1993
JP 05197470 A * 8/1993
JP 6-189374 7/1994
JP 7-95662 4/1995
JP 2001-359179 12/2001

OTHER PUBLICATIONS

Patent Abstracts of Japan, Publication No. 2001-359179 dated Dec. 26, 2001, 1 pg.
Patent Abstracts of Japan, Publication No. 07-095662 dated Apr. 7, 1995, 1 pg.

(Continued)

*Primary Examiner*—Aung Moe
(74) *Attorney, Agent, or Firm*—Osha Liang LLP

(57) ABSTRACT

A remote controller includes a plurality of keys, which are operated to transmit infrared signals different for each key. A receiving device executes different kinds of operations based on the kind of signal received from the remote controller. The receiving device can change the correspondence between the kind of signal received from the remote controller and the kind of operation to be executed.

3 Claims, 7 Drawing Sheets

OTHER PUBLICATIONS

Patent Abstracts of Japan, Publication No. 06-189374 dated Jul. 8, 1994, 1 pg.

Patent Abstracts of Japan, Publication No. 01-119181, Publication Date: May 11, 1989, 1 page.

Patent Abstracts of Japan, Publication No. 05-197470, Publication Date: Aug. 6, 1993, 1 page.

Notice of Ground of Rejection for Japanese Patent Application No. 2002-368210 mailed Jun. 14, 2005 and English translation thereof (4 pages).

* cited by examiner

FIG.3A

| IR CODE | KEY CODE |
|---|---|
| 1 | 1 |
| 2 | 2 |
| 3 | 3 |
| 4 | 4 |
| 5 | 5 |
| 6 | 6 |
| | |
| | |
| Disp | Disp |
| Mute | Mute |
| | |

FIG.3B

| KEY CODE | PROCESS DETAILS |
|---|---|
| 1 | A |
| 2 | B |
| 3 | C |
| 4 | D |
| 5 | E |
| 6 | F |
| | |
| | |
| Disp | X |
| Mute | G |
| | |

FIG.7

| IR CODE | KEY CODE |
|---|---|
| 1 | 1 |
| 2 | 2 |
| 3 | 3 |
| 4 | 4 |
| 5 | 5 |
| 6 | 6 |
| | |
| | |
| Disp | 6 |
| Mute | Mute |
| | |

RECEIVING DEVICE EXECUTING OPERATION OF KIND CORRESPONDING TO KIND OF RECEIVED SIGNAL

BACKGROUND OF THE INVENTION

1. Field of the Invention

The present invention relates to a receiving device, and more particularly to a receiving device that is capable of receiving information transmitted from an external transmission device such as a remote controller and operates based on the received information.

2. Description of the Background Art

Conventionally, a remote controller provided with a plurality of keys may sometimes suffer failures of frequently used keys. In order to solve such a problem, the functions associated with the keys may be changed in the remote controller.

A technique for changing functions associated with keys in a remote controller is disclosed in Japanese Patent Laying-Open No. 2001-359179 (document 1) wherein the functions associated with the keys on the remote controller are displayed on a monitor on the side of a receiving device that receives a signal output by the remote controller, so that the user operates a key associated with a desired function with reference to the display image on the monitor.

Japanese Patent Laying-Open Nos. 7-95662 (document 2) and 6-189374 (document 3) disclose a technique for changing functions associated with keys by executing, at a remote controller, a process of changing a correspondence between keys and signals output to a receiving device.

It cannot be said, however, that the technique disclosed in document 1 is a technique that compensates for a function of a defective key on a remote controller with the other key or the like thereby eliminating the need to use the defective key. In other words, it is hard to say that this technique perfectly accommodates key defects in a remote controller.

Furthermore, documents 2 and 3 appear to increase the functions to be provided on a remote controller, resulting in increased size and poor operability of the remote controller. Moreover, when the remote controller suffers a key defect, the process of changing the correspondence between keys and output signals must be performed with the defective key left as it is, which is far from user-friendly.

SUMMARY OF THE INVENTION

The present invention is therefore made in view of the foregoing situation and aims to provide a receiving device that allows a function of a possible defective key on a remote controller to be taken over by another key without increasing the remote controller in size.

In accordance one aspect of the present invention, a receiving device receives a signal transmitted from an external transmission device to execute an operation of a kind corresponding to a kind of the received signal. The receiving device includes: a receiving unit receiving a signal transmitted from the external transmission device; a converting unit converting the signal received by the receiving unit into a kind of operation which the receiving device must execute; a first storage unit storing kinds of the received signals and kinds of operations to be executed in accordance with the kinds of the received signals by the receiving unit in association with each other; a storage changing unit changing, based on a request from the transmission device, a correspondence in the first storage unit between a kind of the received signal and a kind of operation to be executed in accordance with the kind of the received signal; a second storage unit storing a kind of signal, among the kinds of the received signals, of which correspondence with a kind of operation should not be changed. The converting unit converts the signal received by the receiving unit into a kind of operation based on the correspondence in the first storage unit. If the request from the external transmission device is intended to change the kind of signal stored in the second storage unit, of which correspondence with a kind of operation should not be changed, the storage changing unit announces, before changing the correspondence in the first storage unit, that the correspondence should not be changed.

In accordance with another aspect of the present invention, a receiving device receives a signal transmitted from an external transmission device to execute an operation of a kind corresponding to a kind of the received signal. The receiving device includes: a receiving unit receiving a signal transmitted from the external transmission device; and a converting unit converting the signal received by the receiving unit into a kind of operation which the receiving device must execute. The converting unit changes a kind of operation converted from the signal received from the external transmission device according to a request from the external transmission device.

Preferably, the receiving device further includes: a first storage unit storing kinds of the received signals and kinds of operations to be executed in accordance with the kinds of the received signals by the receiving unit in association with each other; and a storage changing unit changing, based on a request from the transmission device, a correspondence in the first storage unit between a kind of the received signal and a kind of operation to be executed in accordance with the kind of the received signal. The converting unit converts the signal received by the receiving unit into a kind of operation based on the correspondence in the first storage unit.

Preferably, the receiving device further includes a second storage unit storing a kind of signal, among the kinds of the received signals, of which correspondence with a kind of operation should not be changed. If the request from the external transmission device is intended to change the kind of signal stored in the second storage unit, of which correspondence with a kind of operation should not be changed, the storage changing unit announces, before changing the correspondence in the first storage unit, that the correspondence should not be changed.

In accordance with the present invention, when a key defect or the like occurs at a remote controller, the remote controller needs only to make a request to a receiving device for a process of changing the correspondence between kinds of received signals and kinds of operations to be executed and may not execute a process of changing the correspondence between keys and kinds of signals to be transmitted. Therefore, a function of any possible defective key on the remote controller can be taken over by another key without increasing the remote controller in size.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B illustrate contents stored in a database shown in FIG. 1.

FIG. 7 illustrates a table shown in FIG. 3A as being modified.

DESCRIPTION OF THE PREFERRED EMBODIMENT

Figure 1:
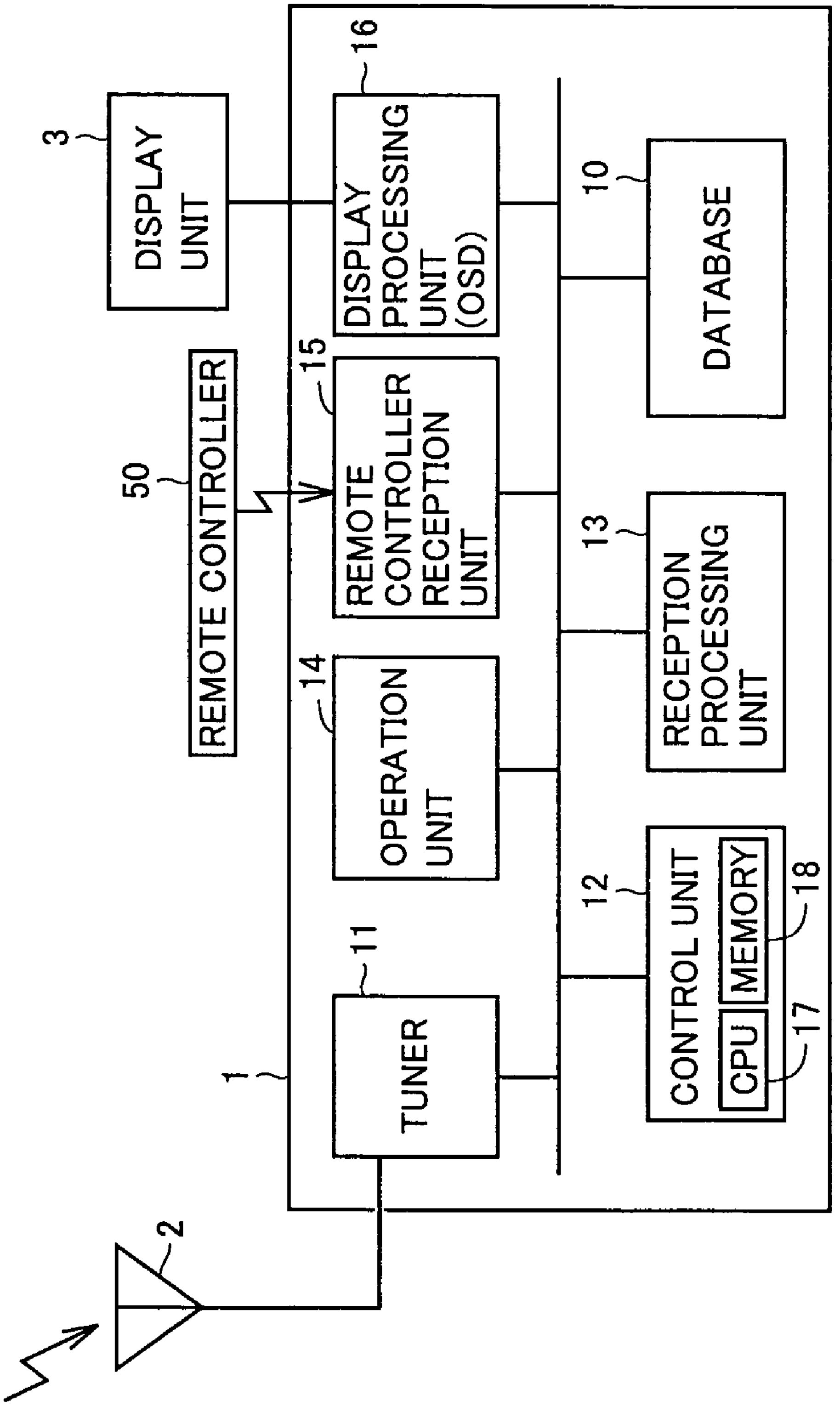
FIG. 1 is a diagram showing a configuration of a receiving device with peripheral units thereof in accordance with an embodiment of the present invention.

In the following, an embodiment of the present invention will be described with reference to the FIGS. It is noted that in the following description, the same parts will be denoted with the same reference characters and provided with the same names and functions, unless otherwise specified. Therefore, the detailed description thereof will not be repeated.

Referring to FIG. 1, a receiving device 1 receives broadcast signals from an antenna 2 and performs a variety of processing on a signal of the received broadcast signals that corresponds to a desired channel, for on-screen display in a display unit 3 such as a television receiver.

Receiving device 1 includes a tuner 11 for selectively extracting a signal corresponding to a channel as desired by a user from the received broadcast signals via antenna 2, a control unit 12 including a CPU (Central Processing Unit) 17 and a memory 18, a reception processing unit 13 for converting the signal corresponding to the desired channel extracted by tuner 11 into a signal processible in receiving device 1, an operation unit 14 such as buttons provided on a front panel (not shown) to be operated by the user, a remote controller reception unit 15 receiving infrared signals from a remote controller 50, and a display processing unit 16 including an OSD (On Screen Display). Receiving device 1 further includes a database 10 storing kinds of signals received from remote controller 50 in association with kinds of operations including selecting channels.

When the user operates operation unit 14 or operates remote controller 50 via remote controller reception unit 15 to selectively designate a desired channel, information of the designated channel is supplied to control unit 12. CPU 17 of control unit 12 controls tuner 11 based on the supplied information of the desired channel such that a signal corresponding to the desired channel is extracted from the received broadcast signals.

Figure 2:
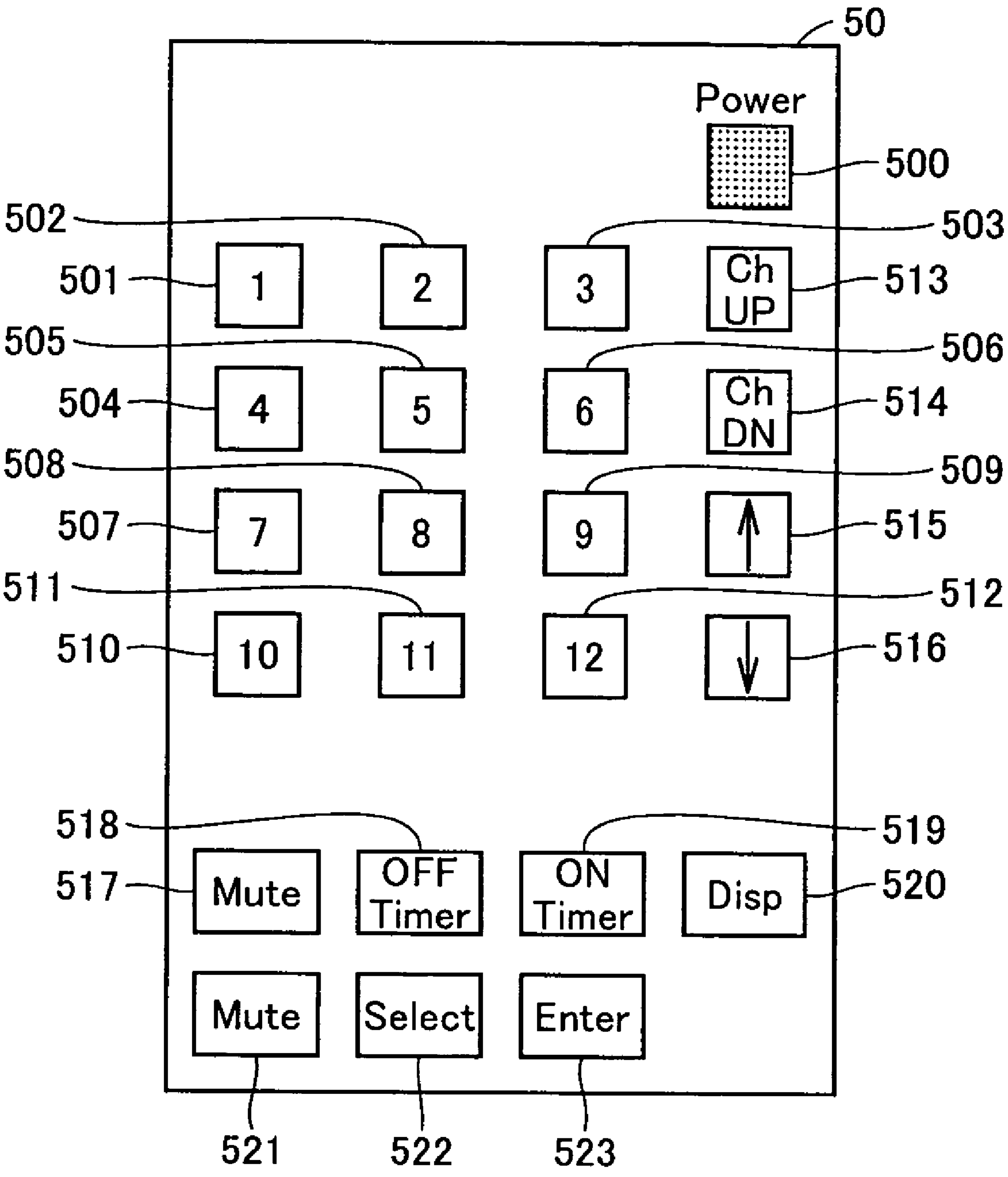
FIG. 2 is a planar view of a remote controller shown in FIG. 1.

Turning to FIG. 2, remote controller 50 includes a plurality of keys 500–523. Key 500 is operated to turn on/off receiving device 1. Keys 501–512 basically correspond to channels 1–12, respectively. To input a numerical value to receiving device 1, keys 501–512 each are used to input a value corresponding to a numerical value of a channel. Key 520 is used to make a variety of settings on display unit 3.

By operating keys 500–523, remote controller 50 of the present embodiment can transmit infrared signals different for each operated key. In the present embodiment, receiving device 1 can change the correspondence between keys operated at remote controller 50 and operations to be executed by performing a process in receiving device 1 as described later.

FIG. 3A shows a table representing a correspondence between IR codes received from remote controller 50 and key codes, i.e. codes corresponding to kinds of processes to be executed in receiving device 1. FIG. 3B shows a table in which the key codes are associated with the contents of the actual processes.

As shown in FIG. 3A, in receiving device 1, IR codes corresponding to respective keys on remote controller 50 are respectively associated with key codes. As shown in FIG. 3B, the key codes are respectively associated with the details of specific processes (as represented by the symbols “A”, “B”, “C”, “D”, etc. in FIG. 3B for the sake of convenience) in receiving device 1.

Figure 4:
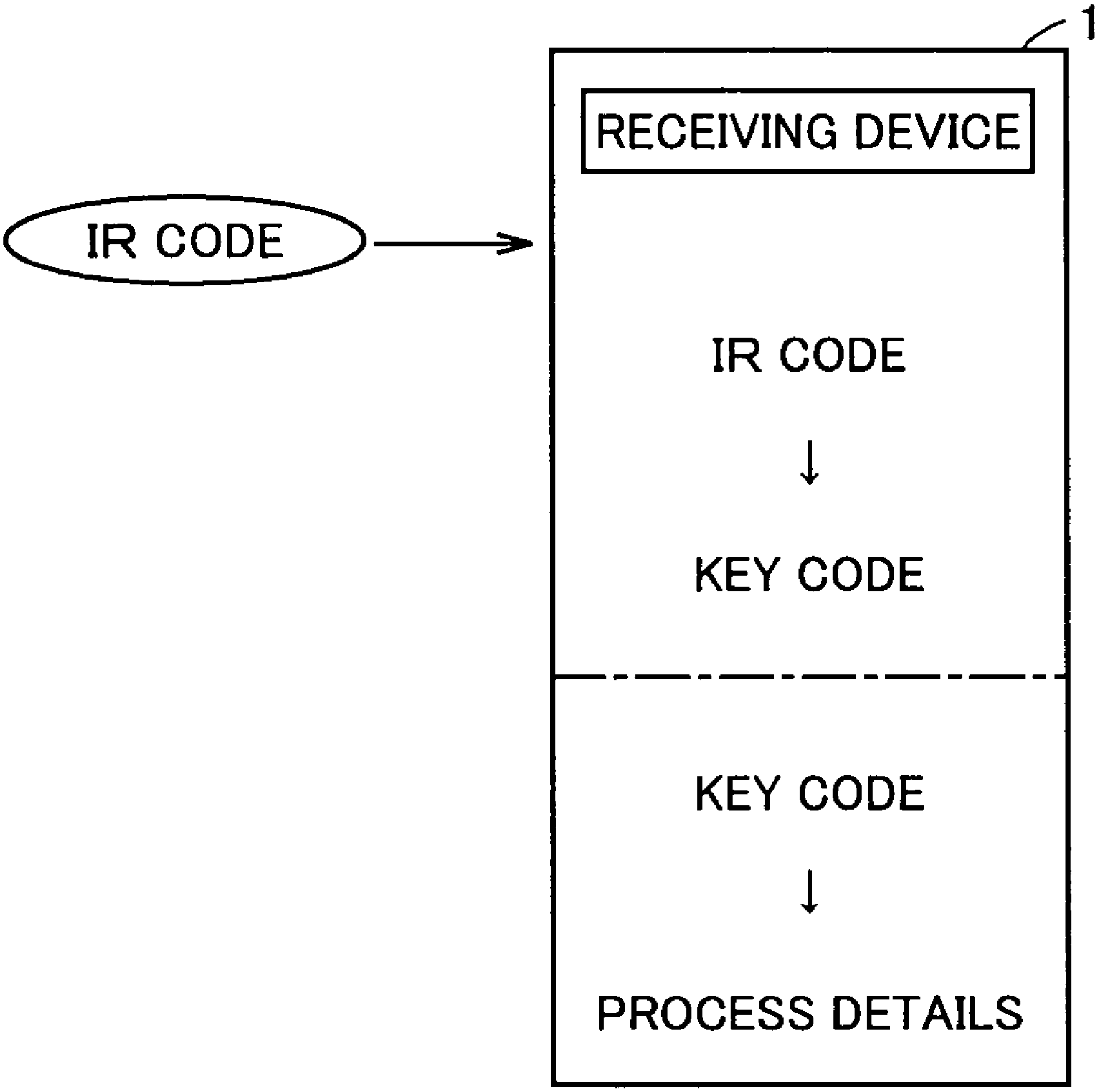
FIG. 4 illustrates a process for the receiving device to execute a process corresponding to an IR (Infrared Radiation) code of the received signal when a control unit of FIG. 1 receives a signal from the remote controller.

Referring to FIG. 4, first, control unit 12 receives a signal from remote controller 50 to convert an IR code included in the signal into a key code with reference to the table shown in FIG. 3A. Control unit 12 then converts the key code obtained by the conversion into the content of the actual process with reference to the table shown in FIG. 3B and executes the detailed process as obtained by the conversion.

Figure 5:
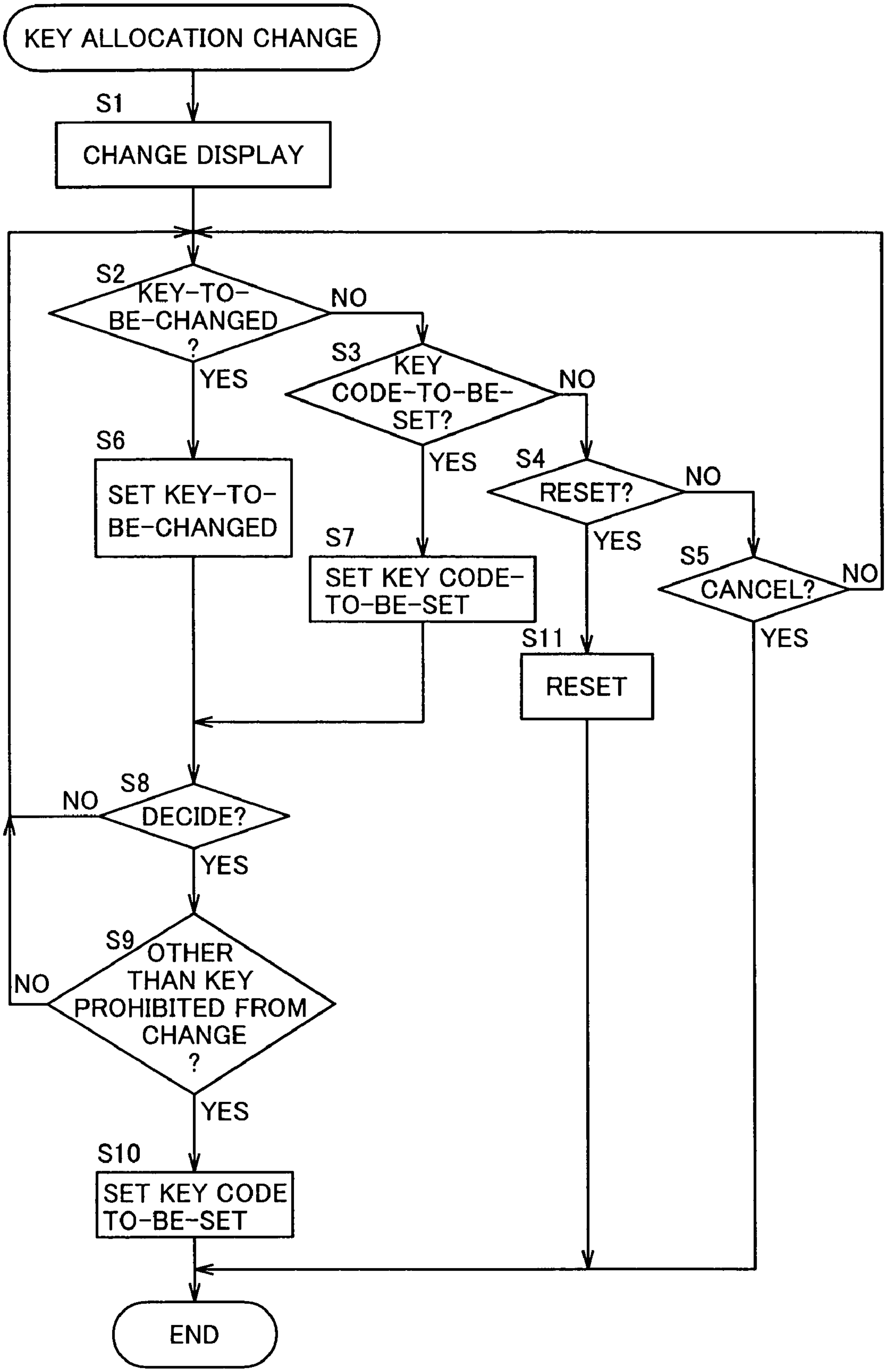
FIG. 5 is a flow chart of a key allocation change process executed in the control unit of FIG. 1.

Turning to the flow chart shown in FIG. 5, a key allocation change operation to be executed by control unit 12 will be described. The key allocation change process is a process to be executed to change the correspondence between kinds of keys operated on remote controller 50 and kinds of operations executed in receiving device 1.

When an operation to execute the key allocation change process is performed in operation unit 14 or remote controller 50, at step S1 (step will be abbreviated as S hereinafter), control unit 12 causes display unit 3 to show a display image for changing the key code to which the key of remote controller 50 is allocated (as abbreviated hereinafter as an allocation change display). An exemplary display as shown at this time is illustrated in FIG. 6.

Figure 6:
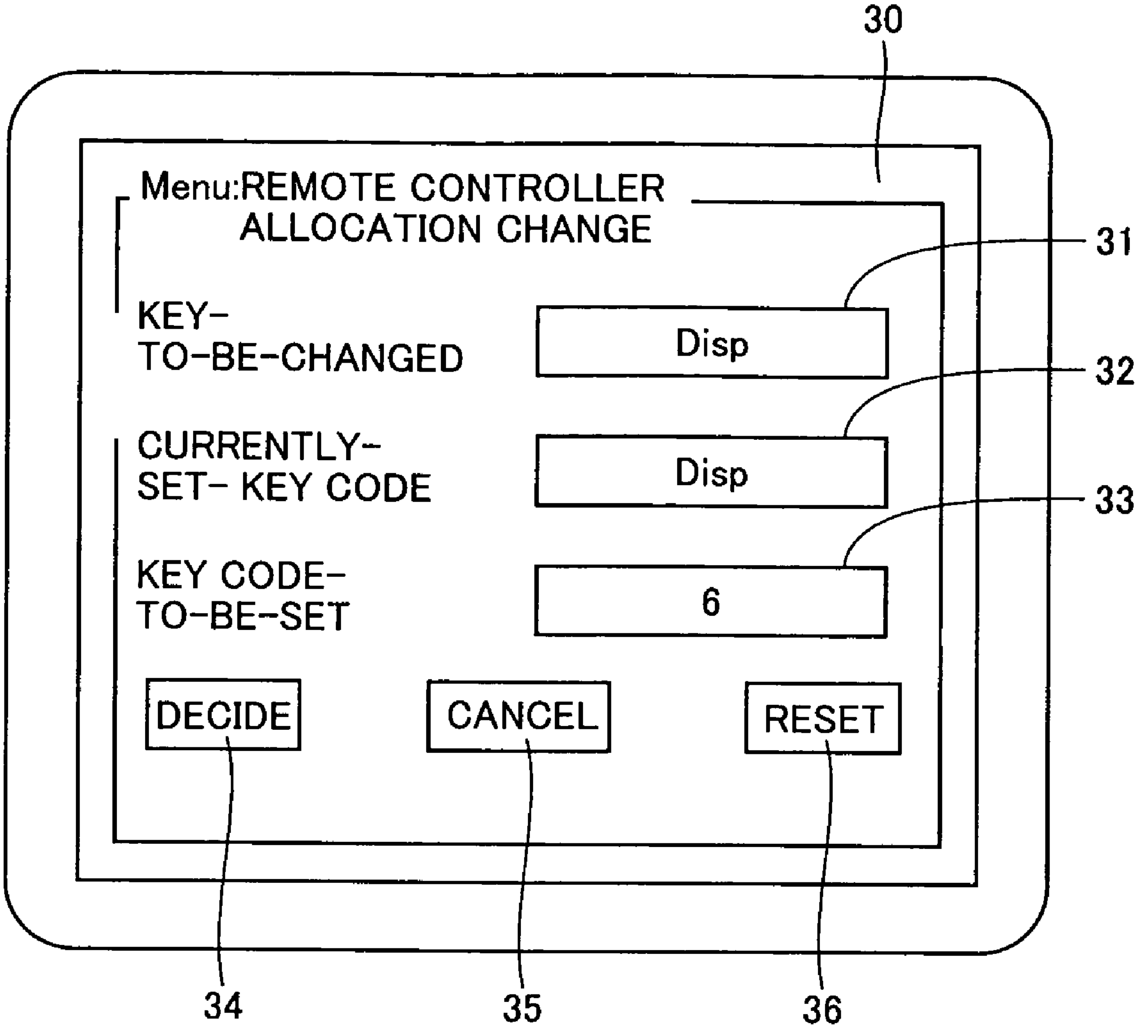
FIG. 6 shows an exemplary allocation change display appearing during execution of the key allocation change process.

Referring to FIG. 6, the allocation change display on a screen 30 includes a key-to-be-changed display section 31, a currently-set-key code display section 32, a key code-to-be-set display section 33, a decide button 34, a cancel button 35, and a reset button 36.

Key-to-be-changed display section 31 shows a name of a key, among keys 501–523, of which allocation is to be changed. Currently-set-key code display section 32 shows a key code that is currently set for the key shown in key-to-be-changed display section 31. Key code-to-be-set display section 33 shows a key code that will be associated with the key shown in key-to-be-changed display section 31. Decide button 34 is a button operated to confirm a change with the combination of the key shown in key-to-be-changed display section 31 and the key code shown in key code-to-be-set display section 33. Cancel button 35 is a button operated to terminate the key allocation change process at present. Reset button 36 is a button operated to reset the key codes associated with all of keys 501–523 to those as set at the time of shipment.

It is noted that a cursor (not shown) is displayed on screen 30. The user operates operation unit 14 or remote controller 50 as appropriate to move the cursor to determine which of key-to-be-changed display section 31, currently-set-key code display section 32, key code-to-be-set display section 33, decide button 34, cancel button 35, and reset button 36 will be a user's operation target.

Returning to FIG. 5, after the process at S1, control unit 12 determines whether or not the user's operation target is set to key-to-be-changed display section 31 at S2. If yes, the process goes on to S6. If no, the process goes on to S3.

At S3, control unit 12 determines whether or not the user's operation target is set to key code-to-be-set display section 33. If yes, the process goes on to S7. If no, the process goes on to S4.

At S4, control unit 12 determines whether or not the user's operation target is set to reset button 36. If yes, the process goes on to S11. If no, the process goes on to S5.

At S5, control unit 12 determines whether or not the user's operation target is set to cancel button 35, and terminates the key allocation change process. If no, the process returns to S2.

At S6, control unit 12 receives from the user an input of a kind of key corresponding to key-to-be-changed display section 31, and the process then goes on to S8. It is noted that at S6 control unit 12 allows the kind key input by the user to appear on key-to-be-changed display section 31 and also allows the key code that corresponds to the kind of key (IR code) shown in key-to-be-changed display section 31 in the table of FIG. 3A to appear on currently-set-key code display section 32.

At S7, control unit 12 receives from the user an input of a key code corresponding to key code-to-be-set display section 33, and the process goes on to S8.

At S8, control unit 12 determines whether or not the user's operation target is set to decide button 34. If yes, the process goes on to S9. If no, the process returns to S2.

At S9, control unit 12 determines whether or not the key that has been input as the kind of key corresponding to key-to-be-changed display section 31 is a key other than those keys which are prohibited from the key code allocation change in remote controller 50. Such keys include, for example, key 500 for turning on/off receiving device 1 and a key for starting the key allocation change process. In receiving device 1, the keys prohibited from the key code allocation change, among the keys on remote controller 50, are stored in database 10 or memory 18. When it is determined as the key other than the keys prohibited from the key code allocation change, the process proceeds to S10. When it is determined as the key prohibited from the change, the process returns to S2. It is noted that when it is determined at S9 that the kind of key corresponding to key-to-be-changed display section 31 is a key prohibited from the change, control unit 12 causes display unit 3 to show that the correspondence should not be changed. The process then returns to S2.

At S10, control unit 12 sets the correspondence between the IR code and the key code in database 10 to be changed with the combination of the key shown in key-to-be-changed display section 31 and the key code shown in key code-to-be-set display section 33 and then terminates the key allocation change process. In other words, the process at S10 causes the content of the table shown in FIG. 3A to be modified. Specifically, for example, as shown in screen 30 of FIG. 6, when the key code corresponding to the key "Disp" among keys 501–523 is to be changed to "6", the table shown in FIG. 3A is modified as shown in FIG. 7.

While the IR code "Disp" corresponds to the key code "Disp" in the table shown in FIG. 3A, the IR code "Disp" corresponds to the key code "6" in the table shown in FIG. 7. Therefore, when the key corresponding to "Disp" is operated on remote controller 50, before modification of the table, the signal received in response to the operation is converted to the key code "Disp" in receiving device 1 followed by execution of the process corresponding to the key code "Disp", whereas, after modification of the table, the signal received in response to the operation is converted to the key code "6" in receiving device 1 followed by execution of the process corresponding to the key code "6".

Meanwhile, at S11, control unit 12 resets the key codes associated with all of keys 501–523 to those as set at the time of shipment. Specifically, control unit 12 resets the table shown in FIG. 3A to that at the time of shipment. It is noted that database 10 separately stores the state at the time of shipment of the table shown in FIG. 3A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A receiving device configured to receive a signal transmitted from an external transmission device to execute a corresponding operation, comprising:

a receiving unit configured to receive the signal transmitted from said external transmission device;

a converting unit configured to convert the received signal into the corresponding operation to be executed by said receiving device;

a first storage unit configured to store a plurality of kinds of received signals and a plurality of corresponding kinds of operations, each corresponding kind of operation to be executed in accordance with one of the plurality of kinds of received signals;

a storage changing unit configured to change a correspondence in said first storage unit between one of the plurality of kinds of received signals and the corresponding kind of operation to be executed in accordance with the one of the plurality of kinds of received signals based on a request from said external transmission device;

a second storage unit configured to store one kind of signal from among the plurality of kinds of received signals, of which the corresponding kind of operation should not be changed, wherein said converting unit is configured to convert the received signal into one of the plurality of kinds of operations other than the corresponding operation, based on said correspondence in said first storage unit, and if said request from said external transmission device corresponds to changing the kind of signal stored in said second storage unit, of which the corresponding kind of operation should not be changed, said storage changing unit announces, before changing the correspondence in said first storage unit, that the correspondence should not be changed.

2. A receiving device configured to receive a signal transmitted from an external transmission device to execute a corresponding operation, comprising:

a receiving unit configured to receive signal transmitted from said external transmission device;

a converting unit configured to convert the received signal into the corresponding operation to be executed by said receiving device;

a first storage unit configured to store a plurality of kinds of received signals and a plurality of corresponding kinds of operations, each corresponding kind of operation to be executed in accordance with one of the plurality of kinds of received signals; and a storage changing unit configured to change a correspondence in said first storage unit between one of the plurality of kinds of received signals and the corresponding kind of operation to be executed in accordance with the one of the plurality of kinds of received signals based on the request from said external transmission device, wherein said converting unit is configured to change a kind of operation converted from the received signal according to a request from said external transmission device; and wherein said converting unit is configured to convert the received signal into one of the plurality of kinds of operations other than the corresponding operation, based on said correspondence in said first storage unit.

3. The receiving device according to claim 2, further comprising a second storage unit configured to store one kind of signal from among the plurality of kinds of received signals, of which the corresponding kind of operation should not be changed, wherein if said request from said external transmission device corresponds to changing the kind of signal stored in said second storage unit, of which the corresponding kind of operation should not be changed, said storage changing unit announces, before changing the correspondence in said first storage unit, that the correspondence should not be changed.

* * * * *